C. F. JENKINS.
LAWN MOWER.
APPLICATION FILED JUNE 5, 1920.
1,401,156.
Patented Dec. 27, 1921.
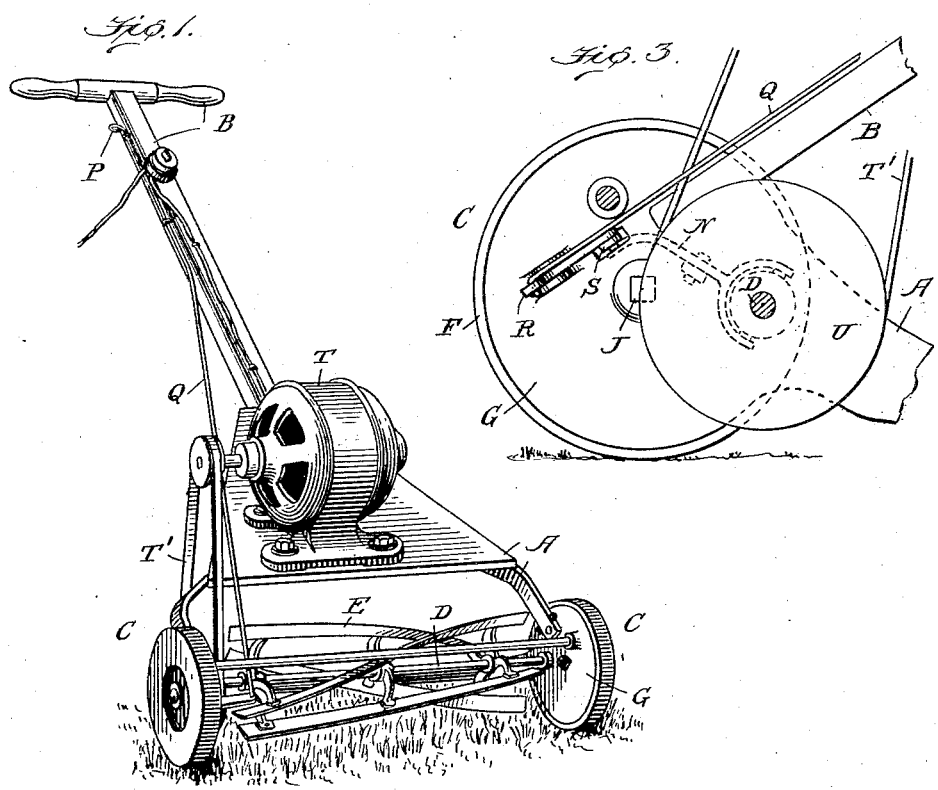
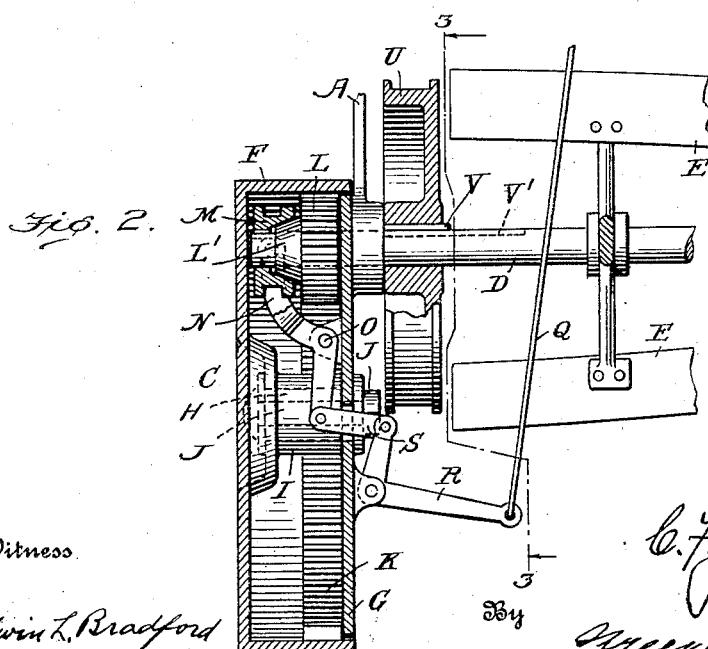

UNITED STATES PATENT OFFICE.

CHARLES FRANCIS JENKINS, OF WASHINGTON, DISTRICT OF COLUMBIA, ASSIGNOR TO MOTO-MOWER COMPANY, OF DETROIT, MICHIGAN, A CORPORATION OF MICHIGAN.

LAWN-MOWER.

1,401,156.   Specification of Letters Patent.   Patented Dec. 27, 1921.

Application filed June 5, 1920. Serial No. 386,718.

*To all whom it may concern:*

Be it known that I, CHARLES FRANCIS JENKINS, a citizen of the United States, and resident of Washington, in the District of Columbia, have invented certain new and useful Improvements in Lawn-Mowers, of which the following is a specification, reference being had therein to the accompanying drawing.

Broadly, this invention involves a lawn mower provided with a motor arranged for driving the cutting devices directly, the machine being also meantime advanced slowly, rapidly, or not at all, as the operator may desire.

It further involves advancing the machine when desired, by the same or a different motor or by manual power. It further involves means for disconnecting the cutting device motor from the cutting and other devices and operatively connecting the cutting devices with means for advancing the machine.

An object then of this invention is to provide a lawn mower having cutting mechanism arranged to be power-operated independently of bodily advance of the machine. Another object is to provide such a lawn mower with devices whereby its bodily advance may be controlled by the operator, with or without the aid of power, so that, while the cutting mechanism is operating, the machine may be advanced as rapidly or slowly as desired or may even be stationary. An ordinary mower cuts properly only while advancing somewhat rapidly and as it cannot then be stopped instantly and exactly at any desired distance from a tree, plant, or obstacle of any kind, and cannot be made to cut in a space too short for it to acquire necessary speed of advance, no cutting in close proximity to obstacles is feasible or safe, and much is necessarily left to be cut by a sickle or by hand clippers. With the arrangement above indicated, however, the cutter may operate at any speed and may while so operating be slowly advanced exactly to any desired point or may even be used to cut, without advance, grass upon which it is lowered from above.

In the accompanying drawings,

Figure 1 is a perspective view of the main portions of a mower provided with my devices.

Fig. 2 is a partial section parallel to the cutter axis and passing through one of the ground wheels.

Fig. 3 is a section on the line 3—3, Fig. 2.

In these figures, A represents the frame, B the handle; C the ground wheels, and D the axle of ordinary rotary spiral cutting blades E coacting with the usual member, not shown. As usual, the wheels C are shells or outwardly closed cups F, inwardly closed by disks G fixed to the frame A, and having central hollow stub shafts upon which rotate central sleeves I of the shell F, the latter being held to the disks by bolts J. The interior of the shell has an annular gear K with which meshes a loose pinion L on the cutter shaft D. The pinion has on one side a cone L' to coact with a clutch member M splined on the shaft D and thrown into and out of frictional engagement by a shipper N pivoted at O and operated from a handle P, near the machine handle B, by a rod Q, bell crank R and link S, the clutch member being normally inactive. The wheels may thus be made to rotate the cutter shaft D so long as the operator holds the clutch in engagement.

The frame A supports in any convenient way or location a motor T shown as an electric switch-controlled motor connected by a belt T' to a pulley U on the shaft D; but a small gasolene motor may be used instead of the motor shown. The motor being in action the cutter is rotated thereby and if the clutch M be engaged the ground wheels are also rotated and the machine is advanced by the power, or by power and manual force of the operator. If the clutch be disengaged, the mower may be moved about wholly by the hands of the operator, the power rotated cutter acting on any grass which it may meet or which it can, by any manipulation, be made to strike.

The motor may, of course, be freed from the cutter in any of many well known ways, one method being the use of a suitable spline at V working in a groove V'. When so freed, the clutch being in operative position, the cutter may be operated by the ground wheel in the usual way.

To reduce the possible striking force of the cutters in meeting an obstruction either the upper pulley or the belt may be adapted to yield readily, and to illustrate a means for reaching this end, the belt T' is made readily extensible, and thereby the momentum of the motor parts is reduced or eliminated.

What I claim is:

1. The combination with a lawn mower frame having a guiding handle, an internally geared ground wheel, and a motor mounted on the frame, of a rotary cutter shaft provided with a loose pinion meshing with the ground wheel, means operable from the guiding handle for compelling the cutter shaft and its pinion to rotate together, and means for driving the cutter shaft from the motor.

2. The combination with a lawn mower frame having a guiding handle and ground wheels one of which is internally geared, of a rotary cutter, a pinion loose upon the cutter shaft and engaging the geared ground wheel, means for engaging the pinion with its shaft, a motor arranged to drive the cutter shaft, and means for disconnecting the motor from the cutter shaft.

3. A lawn mower, comprising a shaft, a rotary cutter carried thereon, a wheel frame on which said cutter is mounted, a motor also mounted on said frame and directly driving said cutter, and releasable friction means under the control of the operator for driving the ground wheels from the cutter shaft.

In testimony whereof I hereunto affix my signature.

CHARLES FRANCIS JENKINS.